United States Patent [19]
Bianco

[11] Patent Number: 5,140,145
[45] Date of Patent: Aug. 18, 1992

[54] BAR CODE READER TEST AND TAMPERING INDICATION SYSTEM

[76] Inventor: James S. Bianco, 217 Brainard Rd., Enfield, Conn. 06082

[21] Appl. No.: 573,843

[22] Filed: Aug. 28, 1990

[51] Int. Cl.⁵ .............................................. G06K 7/10
[52] U.S. Cl. .................................... 235/462; 235/438; 235/455
[58] Field of Search .............. 369/53, 54, 55, 58, 369/79, 47, 48, 116, 44.32; 250/271, 208.4, 566, 569; 356/121; 235/482, 462, 476, 454, 455, 436, 437, 438

[56] References Cited
U.S. PATENT DOCUMENTS

| | | | |
|---|---|---|---|
| 3,906,448 | 9/1975 | Henriques | 235/482 |
| 4,295,040 | 10/1981 | Berthier | 235/454 |
| 4,494,691 | 1/1985 | Boutrois | 250/569 |
| 4,631,713 | 12/1986 | Romeas et al. | 269/116 |
| 4,989,949 | 2/1991 | Imai et al. | 356/121 |

Primary Examiner—Robert Weinhardt
Attorney, Agent, or Firm—John H. Crozier

[57] ABSTRACT

In a preferred embodiment, a method and apparatus for identifying a tampering or malfunction condition in a slot bar code reader which include providing a test signal to the detector in the reader which test signal is present whenever a bar code is not being read. If, for whatever reason, the test signal is not being detected, an alarm or other signal apparatus identifies that a tempering condition is present or that there is some malfunction with the reader. If the lack of a signal is due to tampering, the person responsible can be immediately identified. In any case, the condition can be promptly corrected. The test mode may also be used during the manufacturing process to test the bar code reader. The test signal is provided to the detector in the reader by disposing a reflective surface at the place in the slot that a bar code would be read, so that the test signal from the light source may be reflected to the detector.

8 Claims, 2 Drawing Sheets

BAR CODE READER TEST AND TAMPERING INDICATION SYSTEM

BACKGROUND OF THE INVENTION

1. Field of the Invention

The present invention relates to slot bar code readers generally and, more particularly, to a novel slot bar code reader that incorporates means to immediately identify tampering when the bar code reader is in use and which provides an integral test system for automatically testing the operation of the bar code reader when the bar code reader is installed in the field, the latter being useful, alos, for testing the bar code reader while on the manufacturing line.

2. Background Art

Bar codes have found application in a wide variety of applications as an information source, typically for digital processors. Such bar codes are used at point-of-sale in merchandising for pricing and inventory count, in controlled personnel access systems, for time-and-attendance reporting, and in manufacturing for work-in-prcess and inventory control, to name only a few applicatons. The bar codes themselves comprise a series of parallel lines, typically in the range of about $\frac{1}{8}$" to 1" in height and from about 1 to mill to about 50 mills in thickness, arrayed on a contrasting background. The lines may variously have unequal spacing and/or thickness determined by the informaiton "stored" in the bar code. A bar code is "read" by serially illuminating the bars, with the bars absorbing light and the background reflecting light. The resulting pattern of reflection and nonreflection is sensed by a light detecting device which provides input to the digital processor. The bar code reader may be of the type that is passed over the bar code or of the type with which the bar code is moved passed the bar code reader, the latter reader usually having a slot through which a card bearing the bar code is passed.

A problem with the latter type of bar code reader is that it is subject to tampering. This is particularly a problem in time-and-attendance reporting situations where employees are required to, for example, pass their employee identification cards containing an identifying bar code through a slot bar code reader when entering and exiting their place of work. The information thus obtained may be used for payroll and other purposes. Some employees have found that, by disabling the reader, tardiness or early quitting cannot be detected. One method by which a slot bar code reader may be disabled is to place a piece of tape or similar object over the window in the reader through which the bar codes are read. This tampering may not be discovered for some time, during which period of time no time-and-attendance data is being collected, and, of course, the guilty employee cannot be readily identified.

It would be desirable, then, to be able to immediately identify a tampering condition so that the condition can be promptly corrected and so that the employee responsible can be identified.

According, it is a principal object of the present invention to provide a method and means for the immediate indication that a slot bar code reader has been disabled.

It is a further object of the invention to provide such method and means that may also be employed to test the slot bar code reader while it is in use and to use such method and means to test the reader on the factory assembly line.

It is another object of the invention to provide such method and means that is easily and economically incorporated into the reader.

Other objects of the present invention, as well as particular features and advantages thereof, will be elucidated in, or be apparent from, the following description and the accompanying drawings figures.

SUMMARY OF THE INVENTION

The present invention accomplishes the above objects, among others, by providing, in a preferred embodiment, a method and means for identifying a tampering or malfunction condition in a slot bar code reader which include providing a test signal to the detector in the reader which test signal is present whenever a bar code is not being read. If, for whatever reason, the test signal is not being detected, an alarm or other signal means identifies that a tampering condition is present or that there is some malfunction with the reader. If the lack of a signal is due to tampering, the person responsible can be immediately identified. In any case, the condition can be promptly corrected. The test mode may also be used during the manufacturing process to test the bar code reader. The test signal is provided to the detector in the reader by disposing a reflective surface at the place in the slot that a bar code would be read, so that the test signal from the light source may be reflected to the detector.

BRIEF DESCRIPTION OF THE DRAWING

The invention will be better understood if reference is made to the accompanying drawing figures, in which.

DETAILED DESCRIPTION OF THE PREFERRED EMBODIMENTS

Figure 1:
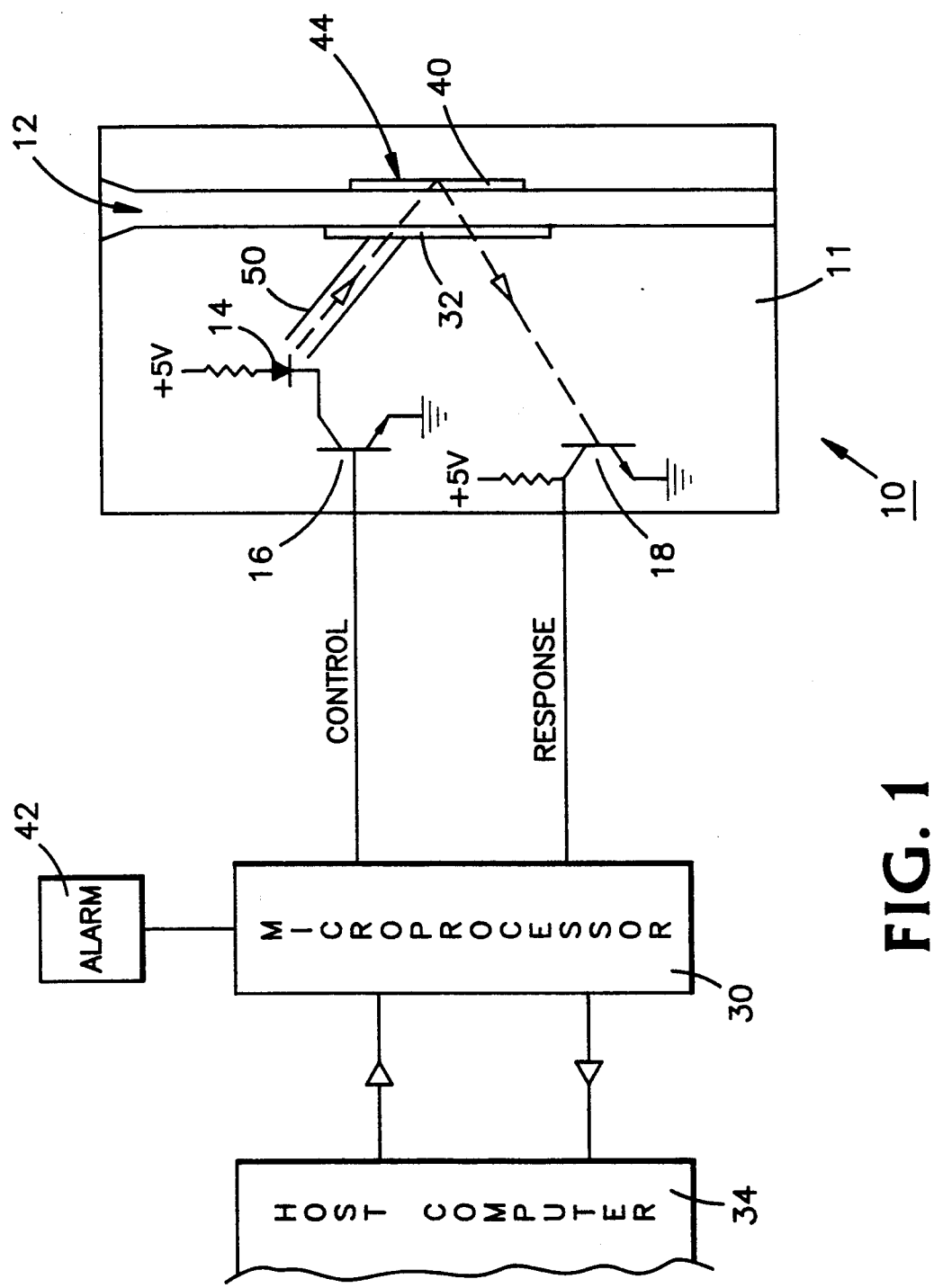
FIG. 1 is a schematic diagram depicting a bar code reading system employing the present invention.

Referring now to the Drawing, FIG. 1 shows a slot bar code reader, generally indicated by the reference numeral 10, which includes a housing 11 in which there is defined a slot 12 through which a card (not shown) bearing a bar code may be passed, a light source such as LED 14 controlled by transistor 16, and a light detector such as phototransistor 18. Bar code reader 10 includes or is connected to a microprocessor 30 which provides a control signal to transistor 16 and receives a response from phototransistor 18. In a conventional slot bar code reader, LED 14 is "on" at all times and, when a bar code is passed through slot 12, the bar code is illuminated through a window 32 and the bar code pattern is reflected to phototransistor 18 also through the window. Microprocessor 30 decodes the bar code information and passes the information, perhaps together with time and date information, to a host computer 34.

As noted above, slot bar code reader 10 may be easily disabled by the placing of a piece of tape over window 32, in which case, microprocessor 30 "reads" the lack of a signal as a condition in which no bar codes are being passed through slot 12. Since microprocessor 30 receives no bar code information, it transmits nothing to host computer 34. In this situation, it is not until some relatively long time has passed that someone notices the lack of data and takes corrective action.

The present invention provides for the immediate identification of a tampering condition or component failure by providing a reflective surface such as mirror 40 disposed in slot 12 opposite window 32 at the point where a bar code would be read. When a bar code is not being read, microprocessor 30 causes LED 14 to emit a pulsed test signal which test signal is reflected by mirror 40 and received by detector 18. As long as microprocessor 30 continues to receive the test signal when a bar code is not being read, the microprocessor determines that there has been no tampering or a component failure. If, however, the test signal is interrupted by other than the reading of a bar code, microprocessor 30 determines that a tampering condition or a component failure exists and may immediately activate an alarm 42 to alert supervisory personnel of the tampering condition or component failure. Alarm 42 or similar means may be located at bar code reader 10 and/or may be remotely located. Thus, the person responsible for the tampering can be immediately identified or steps taken to correct the malfunction.

Mirror 40 is preferably disposed so that the reflecting surface thereof is on back surface 44 to prevent abrasion of the surface by cards passed through reader 10.

A solid-wall channel 50 is provided between LED 14 and window 32 to prevent reflection of light from the LED to phototransistor 18 if someone should place tape over the side of the window adjacent slot 12. The tape would cause the window to become a mirror and the resulting reflection would cause microprocessor 30 to determine erroneously that there had been no tampering.

It will be understood that the system of the present invention may also be conveniently used as a built-in test system when reader 10 is manufactured to verify correct operation of the reader, without having to employ separate test equipment and bar codes.

It will also be understood that the system of the present invention lends itself well to retrofitting to existing bar code reading installations, it only being necessary to install a reflective surface in the reader and to appropriately reprogram the microprocessor.

Figure 2:
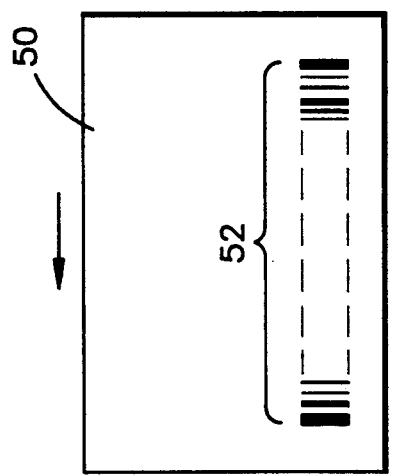
FIG. 2 illustrates a card containing a bar code which may be read with the system of FIG. 1.

FIG. 2 illustrates a card 50 having printed thereon a bar code 52.

Figure 3:
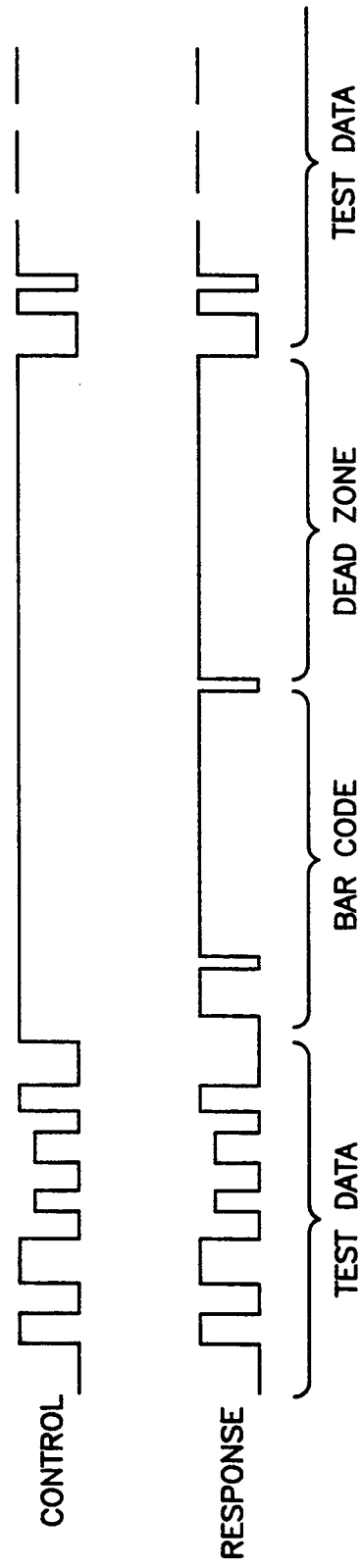
FIG. 3 is a schematic diagram indicating the control and response signals of the system of FIG. 1 reading the bar code on the card of FIG. 2.

FIG. 3 shows test and decoding pulse trains for a slot bar code reader using the present invention. Beginning at the left of the pulse trains, a control signal is generated. The control signal may include pulses of varying widths to simulate bar codes of different widths in order to check the discrimination of the reading system and may include pulses of varying amplitudes to check the peak trackers in the microprocessor. When card 50 containing bar code 52 is passed through the bar code reader, the test pattern is interrupted, the microprocessor causes the light source to be "on" continuously, and the microprocessor begins a decoding routine. After reading the bar code, there is a dead zone of several seconds to allow for slow withdrawal of the card or other system lags and then the test signal is resumed. If the interruption of the test signal was due other than to a valid bar code being read, or if the response to the test signal fails to resume at the end of the dead zone, an alarm condition may be immediately indicated by the microprocessor.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A slot bar code reader system to provide indication of tampering or component failure, comprising:
   (a) a housing;
   (b) a slot defined in said housing through which a bar code may be passed;
   (c) illuminating means disposed so as to illuminate said bar code as it is being passed through said slot;
   (d) light detecting means disposed so as to receive a pattern of reflections from said bar code as said bar code is illuminated and to provide an output signal representative of said pattern of reflections;
   (e) microprocessor means connected to cause said illuminating means to illuminate and to receive said output signal from said light detecting means;
   (f) light reflecting means disposed so as to reflect light from said illuminating means to said light detecting means when no opaque object is disposed between said illuminating means and said light reflecting means;
   (g) said microprocessor means being programmed to cause said illuminating means to provide a test light pulse train to be reflected by said reflecting means to said light detecting means following reading of a bar code; and
   (h) alarm means coupled to said microprocessor means and activatable thereby;
   (i) said microprocessor being programmed to receive said test light pulse train represented by said output signal from said light detecting means and to activate said alarm means if said light pulse train represented by said output signal is not received following reading of a bar code.

2. A slot bar code reader system, as defined in claim 1, wherein said reflecting means comprises a mirror disposed in said slot where said bar code is read.

3. A slot bar code reader system, as defined in claim 1, wherein said test light pulse train includes pulses of varying length.

4. A slot bar code reader system, as defined in claim 1, wherein said test light pulse train includes pulses of varying amplitude.

5. A method of providing indication of tampering or component failure in a slot bar code reader having a slot through which a bar code may be passed, illuminating means disposed so as to illuminate said bar code as it is being passed through said slot, light detecting means disposed so as to receive a pattern of reflections from said bar code as said bar code is illuminated and to provide an output signal representative of said pattern of reflections, and microprocessor means connected to cause said illuminating means to illuminate and to receive said output from said light detecting means said method comprising:
   (a) providing light reflecting means disposed so as to reflect light from said illuminating means to said light detecting means when no opaque object is disposed between said illuminating means and said light reflecting means;
(b) causing said illuminating means to provide a test light pulse train to be reflected by said reflecting means to said light detecting means; and
(c) providing am alarm condition signal when said light detecting means does not provide an output signal representative of said light pulse train during the time said light pulse train is provided by said illuminating means.

6. A method, as defined in claim 5, wherein said reflecting means comprises a mirror disposed in said slot where said bar code is read.

7. A method, as defined in claim 5, wherein said test light pulse train includes pulses of varying length.

8. A method, as defined in claim 5, wherein said test light pulse train includes pulses of varying amplitude.

* * * * *